United States Patent
Hwang et al.

(10) Patent No.: US 12,479,959 B2
(45) Date of Patent: *Nov. 25, 2025

(54) POLYAMIC ACID COMPOSITION, METHOD FOR PREPARING POLYAMIC ACID COMPOSITION, POLYIMIDE COMPRISING THE SAME AND COATING MATERIAL COMPRISING THE SAME

(71) Applicant: PI ADVANCED MATERIALS CO., LTD., Chungcheongbuk-do (KR)

(72) Inventors: In Hwan Hwang, Seoul (KR); Gyeong Hyeon Ro, Gyeongsangnam-do (KR); Ik Sang Lee, Gyeongsangbuk-do (KR)

(73) Assignee: PI ADVANCED MATERIALS CO., LTD., Chungcheongbuk-do (KR)

( * ) Notice: Subject to any disclaimer, the term of this patent is extended or adjusted under 35 U.S.C. 154(b) by 892 days.

This patent is subject to a terminal disclaimer.

(21) Appl. No.: 17/624,839

(22) PCT Filed: Oct. 30, 2019

(86) PCT No.: PCT/KR2019/014432
§ 371 (c)(1),
(2) Date: Jan. 4, 2022

(87) PCT Pub. No.: WO2021/006430
PCT Pub. Date: Jan. 14, 2021

(65) Prior Publication Data
US 2022/0267520 A1    Aug. 25, 2022

(30) Foreign Application Priority Data

Jul. 5, 2019 (KR) .................. 10-2019-0081067

(51) Int. Cl.
| | | |
|---|---|---|
| *C08G 69/26* | (2006.01) | |
| *C08G 73/10* | (2006.01) | |
| *C09D 179/08* | (2006.01) | |
| *H01B 3/30* | (2006.01) | |

(52) U.S. Cl.
CPC ....... *C08G 69/265* (2013.01); *C08G 73/1085* (2013.01); *C09D 179/08* (2013.01); *H01B 3/306* (2013.01)

(58) Field of Classification Search
CPC .............. C08G 69/265; C08G 73/1039; C08G 73/1042; C08G 73/1067; C08G 73/1085; C08G 73/1028; C08L 79/08; C08L 2203/202; C09D 179/08; H01B 3/306; H01B 7/02; H01B 3/30
See application file for complete search history.

(56) References Cited

FOREIGN PATENT DOCUMENTS

| | | | |
|---|---|---|---|
| JP | 2002500101 A | 1/2002 | |
| JP | 2002500104 A | 1/2002 | |
| JP | 2002327056 A | 11/2002 | |
| JP | 2010513591 A | 4/2010 | |
| JP | 2018165346 A | 10/2018 | |
| KR | 1020070017001 A | 2/2007 | |
| KR | 1020110108894 A | 10/2011 | |
| KR | 1020130077947 A | 7/2013 | |
| KR | 20140037173 A * | 3/2014 | .............. C08L 79/08 |
| KR | 1020150112628 A | 10/2015 | |

OTHER PUBLICATIONS

JP 2022-500104—1st Office Action dated Feb. 13, 2023, cited references being submitted.
CN 2019800981573—1st Office Action dated Apr. 21, 2023, cited references being submitted.

* cited by examiner

*Primary Examiner* — Lynda Salvatore
(74) *Attorney, Agent, or Firm* — Dority & Manning, P.A.

(57) ABSTRACT

The present application relates to a polyamic acid composition, a method for preparing the polyamic acid composition, a polyimide comprising the same, and a coating material comprising the same, which provides a polyamic acid composition capable of implementing a low permittivity and heat resistance, and insulation properties, adhesion and mechanical properties in a harsh condition such as a high temperature simultaneously, a method for preparing the polyamic acid composition, a polyimide comprising the same and a coating material comprising the same.

12 Claims, No Drawings

POLYAMIC ACID COMPOSITION, METHOD FOR PREPARING POLYAMIC ACID COMPOSITION, POLYIMIDE COMPRISING THE SAME AND COATING MATERIAL COMPRISING THE SAME

CROSS-CITATION WITH RELATED APPLICATIONS

This application claims the benefit of priority based on Korean Patent Application No. 10-2019-0081067 dated Jul. 5, 2019, the disclosure of which is incorporated herein by reference in its entirety.

TECHNICAL FIELD

The present application relates to a polyamic acid composition, a method for preparing the polyamic acid composition, a polyimide comprising the same, and a coating comprising the same.

BACKGROUND

An insulating layer (insulation coating) coating a conductor is required to have excellent insulation properties, adhesion to the conductor, heat resistance, mechanical strength, and the like.

Furthermore, in an electric device having a high applied voltage, such as a motor used at a high voltage, the high voltage is applied to insulated wires constituting the electric device, whereby a partial discharge (corona discharge) is liable to occur on the insulation coating surface thereof.

The occurrence of corona discharge may cause a local temperature increase or generation of ozone or ions, resulting in deterioration in the insulation coating of the insulated wires, thereby causing early insulation breakdown and shortening the life of the electric device.

Insulated wires used at high voltages are required to increase the corona discharge initiation voltage for the above reasons, and for this purpose, it is known that it is effective to lower the permittivity of the insulating layer.

Resins usable for the insulating layer may be exemplified by polyimide resins, polyamideimide resins, polyesterimide resins, and the like.

Among these, in particular, the polyimide resin is a material having excellent heat resistance and insulation properties, which has excellent properties for use as a material for coating a conductor.

The polyimide resin refers to a high heat-resistant resin prepared by solution-polymerizing an aromatic dianhydride and an aromatic diamine or an aromatic diisocyanate to prepare a polyamic acid derivative, followed by ring-closure dehydration at high temperature and imidization.

As a method of forming an insulating coating using such a polyimide resin, for example, a method of applying or coating a polyimide varnish, which is a precursor of a polyimide resin, around an electric wire made of a conductor, and then imidizing the polyimide varnish in a curing furnace capable of heat treatment at a predetermined temperature can be used.

However, general polyimide resins do not have excellent adhesion force to the conductor despite their excellent physical properties, so that there may be a problem that appearance defects occur when forming the insulation coating.

Accordingly, there is a demand for the production of a polyimide varnish for conductor coating that simultaneously satisfies heat resistance, insulation properties, a low permittivity, adhesion, and mechanical properties.

DISCLOSURE

Technical Problem

The present application provides a polyamic acid composition capable of implementing a low permittivity and heat resistance, and insulation properties and mechanical properties in a harsh condition such as a high temperature simultaneously, a method for preparing the polyamic acid composition, a polyimide comprising the same and a coating material comprising the same.

Technical Solution

The present application relates to a polyamic acid composition. The polyamic acid composition of the present application comprises a diamine monomer and a dianhydride monomer as polymerization units. In one example, the polyamic acid composition of the present application may comprise a non-fluorine-based diamine monomer and a non-fluorine-based dianhydride monomer as polymerization units, and may comprise at least one of a fluorine-based diamine monomer and a fluorine-based dianhydride monomer as polymerization units. The fact that the polyamic acid composition comprises the monomers as polymerization units means a state where a polymerization reaction has occurred between the respective monomers before curing into the polyimide. The polyamic acid composition may have a permittivity of 3.0 or less after curing, and also softening resistance of 500° C. or more, tanδ of 260° C. or more and a dielectric breakdown voltage of 10 kV or more after curing. The upper limit of the permittivity is not particularly limited, which may be 2.95, 2.93, 2.9, 2.88, 2.86, 2.84, 2.82, 2.8 or 2.78, and the lower limit of the permittivity may be 1 or 1.5. Also, the lower limit of the dielectric breakdown voltage may be 10 kV, 10.5 kV, 11 kV, 12 kV, 12.5 kV, 13 kV, 13.3 kV, or 13.6 kV or more, and the upper limit may be 25 kV, 20 kV, or 18 kV or less. In addition, the lower limit of the softening resistance may be 503° C., 505° C., 507° C., 509° C., 512° C., or 518° C. or more, and the upper limit may be 600° C., or 550° C. or less. Furthermore, the lower limit of the tanδ may be 263° C., 265° C., 268° C., 272° C., or 273° C. or more, and the upper limit may be 350° C., or 300° C. or less. The polyamic acid composition of the present application comprises the monomers, whereby it may provide a polyimide capable of simultaneously satisfying la ow permittivity, and heat resistance, insulation properties, adhesion, and mechanical properties at high temperatures after curing, and when used for wire coating through this, it may prevent partial discharge, local deterioration, and insulation breakdown to provide a highly reliable coating material.

The dielectric breakdown voltage (BDV) may be measured by a method known in similar industries. In one example, the dielectric breakdown voltage may be measured as follows. A wire coated with the polyamic acid composition is prepared as a specimen, where the specimen is pretreated in an oven at 150° C. for 4 hours and then placed in a pressure vessel, where the pressure vessel is filled with 1400 g of a refrigerant, and the pressure vessel is heated for 72 hours, and then after cooling the pressure vessel, the specimen is transferred to an oven at 150° C., held for 10 minutes, and cooled to room temperature. The BDV has been measured by connecting both ends of the wire and increasing the alternating voltage of the test voltage (60 Hz) nominal frequency between the wire conductors at a constant rate from zero. In one example, the dielectric breakdown voltage may be one that for example, a sample twisted in two lines is manufactured by applying a load and twist according to IEC 60851 standard thereto, and then a test voltage is applied between the conductors to measure the voltage at which the insulation film of the sample breaks.

In one example, the softening resistance indicates the decomposition temperature of the insulator, which may be determined by measuring the temperature at which a short circuit occurs between two electric wires crossing each other at right angles in a state where the specified load is applied to the crossing point. Specifically, the short-circuit temperature may be measured by overlapping the electric wires so as to cross at right angles and placing them on a flat plate, and applying an alternating voltage of 100 V thereto in a state where a load of 1000 g is applied to the overlapped part, and increasing the temperature at a rate of about 2° C./min in that state.

In addition, the tanδ value of the polyimide coating material, which is a cured product of the polyamic acid composition may be measured as the tanδ using DSE's TD300 Tan Delta Tester. Specifically, by using a conductor as one electrode and a graphite coating as the other electrode, a specimen is connected to a bridge, and the temperature of the assembly is increased at a constant rate to a temperature that gives a clearly defined curve at ambient temperature. The temperatures are taken through a detector in contact with the sample and the results are plotted as a linear axis versus temperature and a log versus tanδ or a graph of the linear axis, where the tanδ value of the polyimide coating material can be calculated through the values.

In this specification, the fluorine-based diamine monomer and the fluorine-based dianhydride monomer may mean monomers including a fluorine atom in the molecular structure. The fluorine atom may be included in various positions and structures in the monomer, which are not particularly limited. For example, the fluorine-based diamine monomer and the fluorine-based dianhydride monomer may include at least one perfluoroalkyl group in the molecular structure. The perfluoroalkyl group may be, for example, a perfluoromethyl group. The present application comprises the fluorine-based monomers as polymerization units, whereby unlike conventionally including fluorine-based particles as an additive, it can lower the permittivity without the additive as well as compatibility and dispersibility problems of the particles, and accordingly can implement heat resistance and mechanical properties together.

In an embodiment of the present application, the fluorine-based diamine monomer and the fluorine-based dianhydride monomer may not be polymerized with each other. That is, in the polyamic acid composition of the present application, the fluorine-based diamine monomer and the fluorine-based dianhydride monomer do not react with each other, and may not directly meet each other in the entire polymerization unit. The prior art has lowered the permittivity using a fluorine-based additive, and the present invention uses a fluorine-based monomer, but there is a limit to sufficiently lowering the permittivity when only the fluorine-based monomer is used without the fluorine-based additive. However, the present application controls the polymerization method and polymerization sequence of the monomers, whereby it is possible to implement heat resistance and mechanical properties after curing together, while sufficiently lowering the permittivity.

In one example, the types of the fluorine-based diamine monomer and the fluorine-based dianhydride monomer of the present application are not particularly limited. In one example, the fluorine-based diamine monomer and the fluorine-based dianhydride monomer may have two or more benzene rings. In one example, the fluorine-based diamine monomer may have, for example, a perfluoroalkyl group that the hydrogen of the benzene ring is substituted. Also, in one example, the fluorine-based diamine monomer may have the above-described perfluoroalkyl group at an alkylene group connecting two benzene rings. Furthermore, in one example, the fluorine-based dianhydride monomer may have a perfluoroalkyl group that the hydrogen of the benzene ring is substituted, and in one example, it may also have the above-described perfluoroalkyl group at an alkylene group connecting two benzene rings.

In one example, the fluorine-based diamine monomer may be included in a range of 45 to 98 mol %, 48 to 95 mol %, or 49 to 92 mol %, relative to 100 mol % of the total diamine monomer. In addition, the fluorine-based dianhydride monomer may be included in a range of 5 to 60 mol %, 8 to 57 mol %, or 9 to 55 mol %, relative to 100 mol % of the dianhydride monomers. Meanwhile, when the total amount of the monomers has been 100 mol %, the total content of the fluorine-based diamine monomer and the fluorine-based dianhydride monomer may be included in a ratio of 20 to 70 mol %, 23 to 60 mol %, 30 to 58 mol %, 35 to 55 mol %, or 42 to 53 mol %. The present application can implement excellent dielectric properties, heat resistance and mechanical properties of the polyimide after curing by adjusting the content ratio of the monomers.

In this specification, the polyamic acid composition may be used in the same meaning as a polyamic acid solution.

The dianhydride monomer that can be used in the preparation of the polyamic acid solution may be an aromatic tetracarboxylic dianhydride, where the aromatic tetracarboxylic dianhydride may be exemplified by pyromellitic dianhydride (or PMDA), 3,3',4,4'-biphenyltetracarboxylic dianhydride (or BPDA), 2,3,3',4'-biphenyltetracarboxylic dianhydride (or a-BPDA), oxydiphthalic dianhydride (or ODPA), diphenylsulfone-3,4,3',4'-tetracarboxylic dianhydride (or DSDA), bis(3,4-dicarboxyphenyl)sulfide dianhydride, 2,2-bis(3,4-dicarboxyphenyl)-1,1,1,3,3,3-hexafluoropropane dianhydride, 2,3,3',4'-benzophenonetetracarboxylic dianhydride, 3,3',4,4'-benzophenonetetracarboxylic dianhydride (or BTDA), bis(3,4-dicarboxyphenyl)methane dianhydride, 2,2-bis(3,4-dicarboxyphenyl)propane dianhydride, p-phenylenebis(trimellitic monoester acid anhydride), p-biphenylenebis(trimellitic monoester acid anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxyphenoxy)phenyl]propane dianhydride (BPADA), 2,3,6,7-naphthalenetetracarboxylic acid dianhydride, 1,4,5,8-naphthalenetetracarboxylic dianhydride, 4,4'-(2,2-hexafluoroisopropylidene)diphthalic acid dianhydride, and the like.

The dianhydride monomer may be used alone or in combination of two or more as needed, but in consideration of the above-described bond dissociation energy, the present application may comprise, for example, pyromellitic dianhydride (PMDA), 3,3',4,4'-biphenyltetracarboxylic dianhydride (s-BPDA) or 2,3,3',4'-biphenyltetracarboxylic dianhydride (a-BPDA).

In addition, the diamine monomer that can be used for preparing the polyamic acid solution is an aromatic diamine, which may be classified and exemplified as follows.

1) diamines having a relatively rigid structure, as diamines having one benzene nucleus in structure, such as 1,4-diaminobenzene (or paraphenylenediamine, PDA), 1,3-diam inobenzene, 2,4-diam inotoluene, 2,6-diam inotoluene, 3,5-diam inobenzoic acid (or DABA), and the like;

2) diamines having two benzene nuclei in structure, such as diaminodiphenyl ethers of 4,4'-diaminodiphenyl ether (or oxydianiline, ODA), 3,4'-diaminodiphenyl ether, and the like, 4,4'-diaminodiphenylmethane (methylenediamine), 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl)sulfide, 4,4'-diaminobenzanilide, 3,3'-dichlorobenzidine, 3,3'-dimethylbenzidine (or o-tolidine), 2,2'-dimethylbenzidine (or m-tolidine), 3,3'-dimethoxybenzidine, 2,2'-dimethoxybenzidine, 3,3'-diaminodiphenyl ether, 3,4'-diaminodiphenyl ether, 4,4'-diaminodiphenyl ether, 3,3'-diaminodiphenylsulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 3,3'-diaminobenzophenone, 4,4'-diaminobenzophenone, 3,3'-diamino-4,4'-dichlorobenzophenone, 3,3'-diamino-4,4'-dimethoxybenzophenone, 3,3'-diaminodiphenylmethane, 3,4'-diaminodiphenylmethane, 4,4'-diaminodiphenylmethane, 2,2-bis(3-aminophenyl)propane, 2,2-bis(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenylsulfoxide, 3,4'-diaminodiphenylsulfoxide, 4,4'-diaminodiphenyl sulfoxide, and the like;

3) diamines having three benzene nuclei in structure, such as 1,3-bis(3-aminophenyl)benzene, 1,3-bis(4-aminophenyl)benzene, 1,4-bis(3-aminophenyl)benzene, 1,4-bis(4-amino)phenyl)benzene, 1,3-bis(4-aminophenoxy)benzene, 1,4-bis(3-aminophenoxy)benzene (or TPE-Q), 1,4-bis(4-aminophenoxy)benzene (or TPE-Q), 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3-aminophenylsulfide)benzene, 1,3-bis(4-aminophenylsulfide)benzene, 1,4-bis(4-aminophenylsulfide)benzene, 1,3-bis(3-aminophenylsulfone)benzene, 1,3-bis(4-aminophenylsulfone)benzene, 1,4-bis(4-aminophenylsulfone)benzene, 1,3-bis[2-(4-aminophenyl)isopropyl]benzene, 1,4-bis[2-(3-aminophenyl)isopropyl]benzene, 1,4-bis[2-(4-aminophenyl)isopropyl]benzene, and the like;

4) diamines having four benzene nuclei in structure, such as 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxy)phenyl] ether, bis[3-(4-aminophenoxy)phenyl] ether, bis[4-(3-aminophenoxy)phenyl] ether, bis[4-(4-aminophenoxy)phenyl] ether, bis[3-(3-aminophenoxy)phenyl] ketone, bis[3-(4-aminophenoxy)phenyl] ketone, bis[4-(3-aminophenoxy)phenyl] ketone, bis[4-(4-aminophenoxy)phenyl] ketone, bis[3-(3-aminophenoxy)phenyl]sulfide, bis[3-(4-aminophenoxy)phenyl]sulfide, bis[4-(3-aminophenoxy)phenyl]sulfide, bis[4-(4-aminophenoxy)phenyl]sulfide, bis[3-(3-aminophenoxy)phenyl]sulfone, bis[3-(4-aminophenoxy)phenyl]sulfone, bis[4-(3-aminophenoxy)phenyl]sulfone, bis[4-(4-aminophenoxy)phenyl]sulfone, bis[3-(3-aminophenoxy)phenyl]methane, bis[3-(4-aminophenoxy)phenyl]methane, bis[4-(3-aminophenoxy)phenyl]methane, bis[4-(4-aminophenoxy)phenyl]methane, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane (BAPP), 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane, and the like.

The diamine monomer may be used alone or in combination of two or more, if necessary, and in consideration of the above-described bond dissociation energy, the present application may comprise, for example, 1,4-diaminobenzene (PPD), 1,3-diaminobenzene (MPD), 2,4-diaminotoluene, 2,6-diaminotoluene or 4,4'-methylenediamine (MDA).

In one specific example, the polyamic acid composition may comprise 15 to 40 wt % of solid contents based on the total weight. The present application adjusts the solid content of the polyamic acid composition, whereby it is possible to prevent the increase in manufacturing cost and process time required to remove a large amount of solvent during the curing process while controlling the viscosity increase.

The polyamic acid composition of the present application may be a composition having a low viscosity characteristic. The polyamic acid composition of the present application may have a viscosity of 10,000 cP or less, or 9,000 cP or less, measured at a temperature of 23° C. and a shear rate of 1 $s^{-1}$. The lower limit is not particularly limited, but may be 500 cP or more, or 1000 cP or more. The viscosity may be measured using, for example, Haake's Rheostress 600, and may be measured under conditions of a shear rate of 1/s, a temperature of 23° C. and a plate gap of 1 mm. The present application provides a precursor composition having excellent processability by adjusting the viscosity range, whereby when coating a conductor wire, it is possible to form a coating material having desired physical properties.

In one embodiment, the polyamic acid composition of the present application may have a weight average molecular weight after curing in a range of 10,000 to 100,000 g/mol, 15,000 to 80,000 g/mol, 18,000 to 70,000 g/mol, 20,000 to 60,000 g/mol, 25,000 to 55,000 g/mol or 30,000 to 50,000 g/mol. In the present application, the term weight average molecular weight means a value converted to standard polystyrene measured by GPC (gel permeation chromatograph).

In the present application, the polyamic acid composition may comprise an organic solvent. The organic solvent is not particularly limited as long as it is an organic solvent in which the polyamic acid can be dissolved, but may be an aprotic polar solvent as one example.

The aprotic polar solvent may include, for example, amide-based solvents such as N,N'-dimethylformamide (DMF), N,N'-diethylformamide (DEF), N,N'-dimethylacetamide (DMAc) and dimethylpropaneamide (DMPA), phenolic solvents such as p-chlorophenol and o-chlorophenol, N-methyl-pyrrolidone (NMP), gamma butyrolactone (GBL) and diglyme, and the like, and these may be used alone or in combination of two or more.

In the present application, the solubility of the polyamic acid may also be adjusted in some cases by using an auxiliary solvent such as toluene, tetrahydrofuran, acetone, methyl ethyl ketone, methanol, ethanol and water.

In one example, the organic solvent may be, for example, N-methyl-pyrrolidone (NMP).

The present application also relates to a method for preparing a polyamic acid composition. The preparation method may be a method for preparing the above-described polyamic acid composition.

In one example, the preparation method may comprise a first step of polymerizing two non-fluorine-based dianhydride monomers to both side amine groups of a fluorine-based diamine monomer; a second step of further polymerizing a non-fluorine-based diamine monomer to the polymerized non-fluorine-based dianhydride monomer and a third step of further polymerizing a fluorine-based or non-fluorine-based dianhydride monomer to the polymerized non-fluorine-based diamine monomer. In addition, the preparation method of the present application may comprise a first step of polymerizing two non-fluorine-based diamine monomers to both side anhydride groups of a fluorine-based dianhydride monomer; a second step of further polymerizing a non-fluorine-based dianhydride monomer to the polymerized non-fluorine-based diamine monomer and a third step of further polymerizing a fluorine-based or non-fluorine-based diamine monomer to the polymerized non-fluorine-based dianhydride monomer. Through the polymerization step of three steps, the present application may prevent from reacting the fluorine-based diamine monomer and the fluorine-based dianhydride monomer with each other, whereby it is possible to implement heat resistance and mechanical properties together with an excellent permittivity.

In an embodiment of the present application, first, the second step proceeding following the first step of polymerizing two non-fluorine-based dianhydride monomers to both side amine groups of a fluorine-based diamine monomer may comprise polymerizing two non-fluorine-based diamine monomers to the two non-fluorine-based dianhydrides. In addition, subsequently, the preparation method may comprise further polymerizing the polymerization units polymerized up to the second step to the two fluorine-based or non-fluorine-based dianhydride monomers. That is, the polymerization units polymerized up to the second step may be connected to each other via the fluorine-based or non-fluorine-based dianhydride. By adjusting such polymerization methods and the polymerization sequence thus generated, the present application can simultaneously implement heat resistance and mechanical properties together with low dielectric properties.

Similarly, in the second step proceeding following the first step of polymerizing two non-fluorine-based diamine monomers to both side anhydride groups of a fluorine-based dianhydride monomer, two non-fluorine-based dianhydride monomers may be polymerized to two non-fluorine-based diamine monomers. Also, subsequently, in the third step, two fluorine-based or non-fluorine-based diamine monomers may be polymerized to two non-fluorine-based dianhydride monomers. In addition, subsequently, in the preparation method, the polymerization units polymerized up to the second step may be further polymerized to the two fluorine-based or non-fluorine-based diamine monomers. That is, the polymerization units polymerized up to the second step may be connected to each other via the fluorine-based or non-fluorine-based diamine monomer. By adjusting such polymerization methods and the polymerization sequence thus generated, the present application can simultaneously implement heat resistance and mechanical properties together with low dielectric properties.

In general, the preparation of the polyamic acid solution uses, for example, a method in which the whole amount of the diamine monomer is put in a solvent, and then the dianhydride monomer is added thereto so as to be substantially equimolar to or in excess of the diamine monomer to be polymerized or a method in which the whole amount of the dianhydride monomer is put in a solvent, and then the diamine monomer is added thereto so as to be substantially equimolar to or in excess of the dianhydride monomer to be polymerized, and the like. Such a method may also be used in the preparation method of the present application.

The present application also relates to a polyimide, which is a cured product of the polyamic acid composition. In one example, the polyimide may be a cured product of the aforementioned polyamic acid composition or a precursor composition prepared by the method for preparing the same.

The present application also relates to a coating material. The coating material may comprise a polyimide, which is a cured product of the above-described polyamic acid composition. The coating material may be coated and cured, for example, on the surface of the conductor. In one example, the coating material may comprise steps of: coating a polyamic acid composition on a conductor surface; and imidizing the polyamic acid composition coated on the conductor surface. The conductor may be a copper wire composed of copper or a copper alloy, but a conductor composed of another metal material such as a silver wire, or various metal-plated wires such as aluminum or tin-plated conducting wires may also be included as the conductor. The thicknesses of the conductor and the coating may be in accordance with KS C 3107 standard. The diameter of the conductor may be in a range of 0.3 to 3.2 mm, and the standard film thickness (average value of the maximum film thickness and the minimum film thickness) of the coating material may be 21 to 194 μm for Type 0, 14 to 169 μm for Type 1, or 10 to 31 μm for Type 2. The cross-sectional shape of the conductor may be a round wire, a rectangular wire, a hexagonal wire, or the like, but is not limited thereto.

The present invention may also provide a coated electric wire comprising a polyimide coating material prepared by coating the polyamic acid composition on an electric wire surface and imidizing it. In one embodiment, the coated electric wire may comprise an electric wire; and a coating material that the above-described polyamic acid composition is coated on the surface of the electric wire and imidized. In addition, the present application may provide an electronic device comprising the coated electric wire.

Advantageous Effects

The present application provides a polyamic acid composition capable of implementing a low permittivity and heat resistance, and insulation properties and mechanical properties in a harsh condition such as a high temperature simultaneously, a method for preparing the polyamic acid composition, a polyimide comprising the same, and a coating material comprising the same.

Best Mode

Hereinafter, the present invention will be described in more detail through Examples according to the present invention and Comparative Examples not according to the present invention, but the scope of the present invention is not limited by Examples presented below.

Example 1

N-methyl-pyrrolidone (NMP) was introduced into a 500 ml reactor equipped with a stirrer and nitrogen injection/ discharge tubes while nitrogen was injected thereto, and after the temperature of the reactor was set to 30° C., 2,2-bis(4-aminophenyl)hexafluoropropane (APHF), a fluorine-based monomer, as a diamine monomer and pyromellitic dianhydride (PMDA), a non-fluorine-based monomer, as a dianhydride monomer were introduced to confirm that they were completely dissolved. Subsequently, 2,2-bis[4-(4-aminophenoxy)phenyl]propane (BAPP), a non-fluorine-based monomer, as a diamine monomer was introduced, and the polymerization reaction was performed in the same manner. Subsequently, 2,2-bis(3,4-anhydrodicarboxyphenyl)hexafluoropropane (6-FDA), a fluorine-based monomer, as a dianhydride monomer was introduced, and the temperature was raised to 40° C. and stirring was continued for 120 minutes while heating. Subsequently, the temperature was raised to 80° C. under a nitrogen atmosphere and stirring was continued for 2 hours while heating. The polymerization reaction was performed in the same manner to prepare a polyamic acid solution.

Examples 2 to 4 and 6, and Comparative Examples 1 to 4 and 6

Polyamic acid compositions of Examples 2 to 4 and 6 were prepared in the same method as in Example 1, except that in Example 1, the monomers and their content ratios were changed as shown in Table 1 below. Polyamic acid compositions of Comparative Examples 1 to 4 and 6 were prepared in the same method as in Example 1, except that the monomers and their contents were each changed as shown in Table 1 below, and two types of diamine monomers and two types of dianhydride monomers were simultaneously introduced.

Example 5 and Comparative Example 5

N-methyl-pyrrolidone (NMP) was introduced into a 500 ml reactor equipped with a stirrer and nitrogen injection/discharge tubes while nitrogen was injected thereto, and after the temperature of the reactor was set to 30° C., 2,2-bis[4-(4-aminophenoxy)phenyl]propane (BAPP), a non-fluorine-based monomer, as a diamine monomer and pyromellitic dianhydride (PMDA), a non-fluorine-based monomer, as a dianhydride monomer were introduced to confirm that they were completely dissolved.

Subsequently, 2,2-bis(3,4-anhydrodicarboxyphenyl)hexafluoropropane (6-FDA), a fluorine-based monomer, as a dianhydride monomer was introduced, and the temperature was raised to 40° C. and stirring was continued for 120 minutes while heating. Subsequently, the temperature was raised to 80° C. under a nitrogen atmosphere and stirring was continued for 2 hours while heating. The polymerization reaction was performed in the same manner to prepare polyamic acid solutions.

TABLE 1

|  |  | Diamine | | Dianhydride | |
|---|---|---|---|---|---|
|  |  | BAPP (mol %) | APHF (mol %) | PMDA (mol %) | 6-FDA (mol %) |
| Example | 1 | 10 | 90 | 90 | 10 |
|  | 2 | 30 | 70 | 70 | 30 |
|  | 3 | 50 | 50 | 50 | 50 |
|  | 4 | 50 | 50 | 70 | 30 |
|  | 5 | 100 | 0 | 50 | 50 |
|  | 6 | 75 | 25 | 75 | 25 |

TABLE 1-continued

|  |  | Diamine | | Dianhydride | |
|---|---|---|---|---|---|
|  |  | BAPP (mol %) | APHF (mol %) | PMDA (mol %) | 6-FDA (mol %) |
| Comparative Example | 1 | 10 | 90 | 90 | 10 |
|  | 2 | 30 | 70 | 70 | 30 |
|  | 3 | 50 | 50 | 50 | 50 |
|  | 4 | 50 | 50 | 70 | 30 |
|  | 5 | 100 | 0 | 50 | 50 |
|  | 6 | 75 | 25 | 75 | 25 |

In a coating curing furnace, an electric wire (coated electric wire) comprising a polyimide coating material having a coating material thickness of 33 to 35 μm was prepared in a state where the coating thickness of the polyamic acid solution to a copper wire having a conductor diameter of 1 mm was adjusted between 2 and 6 μm per one time, the minimum temperature and maximum temperature of the coating curing furnace were adjusted to 350 to 550° C. and the coating rate of the copper wire was adjusted to 12 to 32 m/min.

Experimental Example 1—Thickness

The coating thickness of the prepared polyimide coating material was measured according to KS C 3107 standard.

Experimental Example 2—Permittivity and Dielectric Loss Tangent Values

The permittivity and dielectric loss tangent at 1 GHz of the polyimide coating materials prepared in Examples and Comparative Examples were measured using Keysight's SPDR measuring instrument. As a result, the measured permittivity and dielectric loss tangent values were shown in Table 2 below.

Experimental Example 3—Measurement of Dielectric Breakdown Voltage (BDV)

The specimens prepared in Examples and Comparative Examples were each pretreated in an oven at 150° C. for 4 hours, and then placed in a pressure vessel. The pressure vessel was filled with 1400 g of a refrigerant, the pressure vessel was heated for 72 hours, and then the pressure vessel was cooled, and the specimen was transferred to an oven at 150° C., held for 10 minutes, and cooled to room temperature. The BDV was measured by connecting both ends of the electric wire and increasing the alternating voltage of the test voltage (60 Hz) nominal frequency between the wire conductors at a constant rate from zero.

Experimental Example 4— tanδ Measurement

The tan δ value of the polyimide coating material was measured using DSE's TD300 Tan Delta Tester.

Specifically, by using a conductor as one electrode and a graphite coating as the other electrode, a specimen was connected to a bridge, and the temperature of the assembly was increased at a constant rate to a temperature giving a clearly defined curve at ambient temperature. The temperatures were taken through a detector in contact with the sample and the results were plotted as a linear axis versus temperature and a log versus tanδ or a graph of the linear axis, where the tanδ value of the polyimide coating material was calculated through the values.

Experimental Example 5—Measurement of Softening Resistance

The softening resistance indicates the decomposition temperature of the insulator, which is determined by measuring the temperature at which a short circuit occurs between two electric wires crossing each other at right angles in a state where the specified load is applied to the crossing point.

Specifically, the short-circuit temperature was measured by overlapping the electric wires so as to cross at right angles and placing them on a flat plate, and applying an alternating voltage of 100 V thereto in a state where a load of 1000 g is applied to the overlapped part, and increasing the temperature at a rate of about 2° C./min in that state.

TABLE 2

|  |  | Thickness (μm) | BDV (kV) | tanδ (° C.) | Softening resistance (° C.) | Permittivity (1 GHz) | Dielectric loss tangent (1 GHz) |
| --- | --- | --- | --- | --- | --- | --- | --- |
| Example | 1 | 33 | 13.9 | 260 | 505 | 2.65 | 0.0035 |
|  | 2 | 34 | 13.5 | 265 | 510 | 2.73 | 0.0041 |
|  | 3 | 33 | 12.8 | 265 | 510 | 2.72 | 0.0039 |
|  | 4 | 33 | 12.8 | 270 | 508 | 2.85 | 0.0040 |
|  | 5 | 35 | 12.5 | 270 | 515 | 2.88 | 0.0040 |
|  | 6 | 33 | 12.2 | 275 | 520 | 2.89 | 0.0041 |
| Comparative | 1 | 33 | 10.8 | 250 | 460 | 3.03 | 0.0047 |
| Example | 2 | 33 | 10.5 | 245 | 472 | 3.03 | 0.0052 |
|  | 3 | 34 | 10.7 | 250 | 480 | 3.12 | 0.0052 |
|  | 4 | 33 | 10.1 | 255 | 480 | 3.26 | 0.0058 |
|  | 5 | 33 | 9.6 | 258 | 483 | 3.25 | 0.0056 |
|  | 6 | 33 | 9.3 | 258 | 485 | 3.29 | 0.0062 |

The invention claimed is:

1. A polyamic acid composition comprising a non-fluorine-based diamine monomer and a non-fluorine-based dianhydride monomer as polymerization units, and comprising at least one of a fluorine-based diamine monomer and a fluorine-based dianhydride monomer as polymerization units, wherein the polyamic acid composition has a permittivity of 3.0 or less after curing, softening resistance of 500° C. or more, a dielectric breakdown voltage of 1 0 kV or more, and tanδ of 260° C. or more.

2. The polyamic acid composition according to claim 1, wherein the fluorine-based diamine monomer and the fluorine-based dianhydride monomer comprise at least one perfluoroalkyl group in the molecular structure.

3. The polyamic acid composition according to claim 1, wherein the fluorine-based diamine monomer and the fluorine-based dianhydride monomer do not polymerize with each other.

4. The polyamic acid composition according to claim 1, wherein the fluorine-based diamine monomer or the fluorine-based dianhydride monomer has two or more benzene rings.

5. The polyamic acid composition according to claim 1, wherein the fluorine-based diamine monomer is included in a range of 45 to 98 mol % relative to 100 mol % of the diamine monomers.

6. The polyamic acid composition according to claim 1, wherein the fluorine-based dianhydride monomer is included in a range of 5 to 60 mol % relative to 100 mol % of the dianhydride monomers.

7. The polyamic acid composition according to claim 1, wherein the solid contents are in a range of 15 to 40%.

8. The polyamic acid composition according to claim 1, wherein the viscosity measured under conditions of a temperature of 23° C. and a shear rate of 1 s$^{-1}$ is 10,000 cP or less.

9. A polyimide which is a cured product of the polyamic acid composition of claim 1.

10. A coating material comprising the polyimide of claim 9.

11. A coated electric wire comprising: an electric wire; and a coating material that the polyamic acid composition according to claim 1 is coated on the surface of the electric wire and imidized.

12. An electronic device comprising the coated electric wire according to claim 11.

* * * * *